(12) United States Patent
Kuo et al.

(10) Patent No.: US 8,822,016 B2
(45) Date of Patent: Sep. 2, 2014

(54) MULTI-FUNCTIONAL LABEL SLIDE

(75) Inventors: Yao-Kai Kuo, Taipei (TW); Yung-Hui Hung, Taipei (TW); Cheng-Pi Lee, Taipei (TW)

(73) Assignee: CMC Magnetics Corporation, Taipei (TW)

( * ) Notice: Subject to any disclaimer, the term of this patent is extended or adjusted under 35 U.S.C. 154(b) by 56 days.

(21) Appl. No.: 13/618,469

(22) Filed: Sep. 14, 2012

(65) Prior Publication Data

US 2013/0101757 A1    Apr. 25, 2013

(30) Foreign Application Priority Data

Oct. 20, 2011   (TW) .............................. 100138016 A

(51) Int. Cl.
| | | |
|---|---|---|
| B41M 5/00 | (2006.01) | |
| B44C 1/17 | (2006.01) | |
| G03G 7/00 | (2006.01) | |
| B32B 7/02 | (2006.01) | |
| B32B 27/30 | (2006.01) | |
| B32B 3/02 | (2006.01) | |
| B32B 17/06 | (2006.01) | |
| B32B 27/06 | (2006.01) | |
| B32B 27/36 | (2006.01) | |

(52) U.S. Cl.
CPC . *B32B 7/02* (2013.01); *B32B 27/30* (2013.01); *B32B 27/302* (2013.01); *B32B 3/02* (2013.01); *Y10S 428/914* (2013.01); *B32B 17/06* (2013.01); *B32B 27/06* (2013.01); *B32B 27/36* (2013.01)
USPC ........ 428/195.1; 428/210; 428/213; 428/215; 428/412; 428/426; 428/500; 428/914

(58) Field of Classification Search
CPC ............ B32B 3/02; B32B 7/02; B32B 17/06; B32B 27/30; B32B 27/302; Y10S 428/914
USPC .............. 428/195.1, 210, 213, 215, 412, 426, 428/500, 914
See application file for complete search history.

(56) References Cited

U.S. PATENT DOCUMENTS

| | | | |
|---|---|---|---|
| 2005/0100689 A1* | 5/2005 | He et al. ..................... | 428/32.79 |
| 2010/0086964 A1 | 4/2010 | Walter et al. | |

* cited by examiner

*Primary Examiner* — Betelhem Shewareged
(74) *Attorney, Agent, or Firm* — Roger G.J. Chen

(57) ABSTRACT

The invention relates to a multi-functional label slide, particularly to a label slide adapted to be marked by means of laser induction, thermal induction or ink-jet process. The label slide comprises a substrate wherein at least one area is formed as a mark area. The mark area at least comprises the following structure: a first label layer formed on at least one side of the mark area and a second label layer formed on one side of the first label layer opposite to the substrate. Therefore, the label slide of the invention can be marked by at least two marking ways mentioned above.

17 Claims, 1 Drawing Sheet

MULTI-FUNCTIONAL LABEL SLIDE

BACKGROUND OF THE INVENTION

1. Field of the Invention

The invention relates to a label slide for multi-functional marking, and particularly, to a label slide adapted to be marked by means of laser induction process, thermal induction process or ink-jet process.

2. Description of Related Art

Generally speaking, when an educational organization performs a microorganism observation or a medical institute does the histopathology examination, they all need to use microscope for above-mentioned operation. For conducting the operation, the microorganism to be observed or the histopathology is first placed on a slide and then a cover glass is placed on the object to be observed for observation. However, since there is a plurality of objects to be observed during the observing operation, thus it is important to mark on the slide for the observer clearly understanding what is on the slide.

Conventional way to mark on the slide is often to directly mark the desired content on the slide by oil-based pen, ink-jet coating or induced thermal transfer process, or directly attach a sticker with marking contents to the slide. However, it may cause the falling off of the writing produced by aforesaid means of oil-based pen, ink jet coating or induced thermal transfer process. In addition, attaching the stickers with marking content to the slide may also cause the stickers to fall off the slide due to different adhesive properties of the stickers. Therefore, how to clearly mark the desired marking contents on the slide becomes very important.

An U.S. laid-open patent application US2010/0086964 A1 disclosed a slide with a mark area. The slide can be marked at the mark area by a single way (e.g. handwriting, laser marking and etc.) as desired, but the said laid-open patent application did not recite any detailed description about the slide. In short, the said patent application did not define the structure of the slide.

In addition, commercial slide (such as the slide of the above-mentioned U.S. laid-open patent application) for microscope so far is marked on its label layer surface through handwriting, ink-jet coating or induced thermal transfer process with epoxy ink, ink-jet printable marking ink, and thermal induced printable marking ink as marking material.

As described above, the durability and identification of the label mark produced by means of handwriting are less stable due to falling off of the writing and sloppy handwriting. Although the label mark via ink jet coating and induced thermal transfer process are more stable, the testing institute needs to prepare different slides adapted to the different marking means in order to meet ink jet coating or induced thermal transfer process. Hence, preparing the slides will cause economic issue. Thus, how to provide a multi-functional label slide adapted to various marking ways is the main purpose which the invention is willing to achieve.

SUMMARY OF THE INVENTION

The main purpose of the invention is to provide a slide adapted to be marked by means of laser induction process, thermal induction process or ink-jet process.

The invention utilizes the following technical means in order to achieve the aforesaid inventive purpose, wherein the slide for the first technical means of the invention has a substrate, and at least one area of the substrate is formed as a mark area which at least has the following structure:

a first label layer formed on at least one side of the substrate mark area; and a second label layer formed on one side of the first label layer opposite to the substrate.

Further, the slide for the second technical means of the invention has a substrate, and at least one area of the substrate is formed as a mark area which at least has the following structure:

a first label layer formed on a side of the substrate mark area;

a second label layer formed on one side of the first label layer opposite to the substrate; and a third label layer formed on the other side of the substrate mark area opposite to the first label layer.

The aforesaid first label layer is a layer of laser induced ink coating and the second label layer and third label layer are selected from ink-jet coating or thermal induced ink coating, respectively.

Preferably, a ground color layer is selectively provided between the aforesaid first label layer for the first technical means and the substrate, or between the aforesaid third label layer for the second technical means and the substrate.

By the aforesaid structure of the invention, the slide can be marked with the label layer of laser induced ink coating induced by laser, or marked with the label layer of thermal induced ink coating induced by thermal induction process, or marked with the label layer of ink jet coating via ink-jet process. By the invention, slide can be marked by at least two different means including laser induced marking and thermal induced marking or ink-jet marking. Compared to the slide with conventional structure, it is not necessary for testing institute to prepare different slides for the machines with different marking ways according to the present invention. The cost of preparation of slides can be largely reduced and the problem of liable to falling off of the mark or unclear marking by conventional marking way is solved.

DETAILED DESCRIPTION OF THE INVENTION

Various preferred embodiments with accompanying figures are described in detail as follows.

Figure 1:
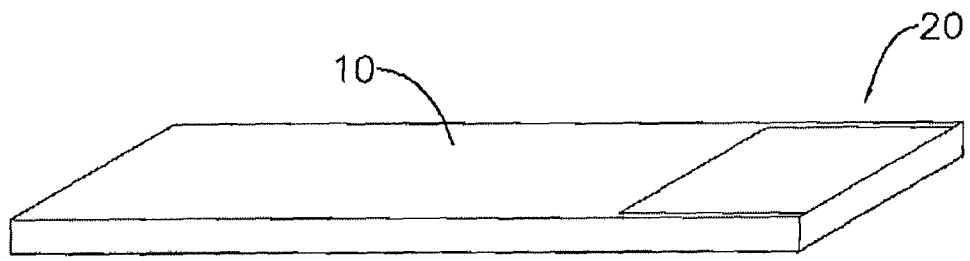
FIG. 1 is a perspective view according to the invention.

As shown in FIG. 1, the first embodiment of the invention has a substrate 10 and at least one area of the substrate 10 is formed as a mark area 20.

Figure 2:
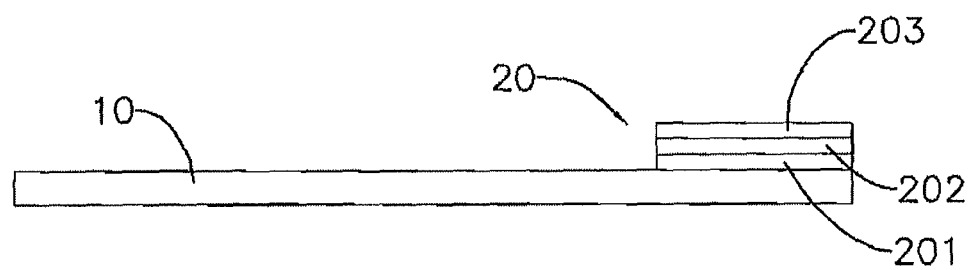
FIG. 2 is a side view of a first embodiment according to the invention.

Please refer to FIG. 2, the mark area 20 comprising the following structure:

A first label layer 202 is formed on one side of the mark area 20 of the substrate 10; and A second label layer 203 is formed on a side of the first label layer 202 opposite to the substrate 10.

A white ground color layer 201 is disposed between the first label layer 202 and the substrate 10.

The aforesaid first label layer 202 is laser induced ink coating and the second label layer 203 is ink-jet coating or thermal induced ink coating.

Each of the aforesaid label layers 202, 203 are formed on the substrate 10 respectively by screen printing. Besides, each of the aforesaid label layers 202, 203 can also be formed on the substrate 10 by various conventional coating.

Preferably, the thickness of the first and second label layers 202, 203 is between 5 micrometers and 30 micrometers. If the thickness is less than 5 micrometers, the mark depth may be too shallow to identify. If the thickness is more than 30 micrometers, it may be caused that the thickness of the mark area 20 is so thick that the ink of the mark area 20 may fall off due to collision. Additionally, the thickness of the ground color layer is less than 20 micrometers.

More preferably, the thickness of the first label layer 202 is less than 8 micrometers and the second label layer 203 is less than 12 micrometers.

When the first label layer 202, i.e. laser induced ink coating, is used in the invention as a marking material layer, after the first label layer 202 is irradiated by laser, the surface reaction is produced on the first label layer 202 and causes the change of microstructure, thereby the appearance is changed to achieve the goal of marking.

When the second label layer 203 is used in the invention to mark, thermal induction process or ink-jet process is used to present mark on the label layer so as to achieve the goal of marking. Besides, the second label layer 203 can be further used as a protective layer for the first label layer 202.

In addition, the substrate 10 of the invention is made of optical transparent material, for example: glass, polycarbonate resin, polymethylmethacrylate and polystyrene resin, etc.

The invention can not only mark on a single slide by different ways, but also adapt a single slide to at least two kinds of marking machines with different marking ways.

Following is a brief description of the producing method of the invention, which is an embodiment and is not intended to limit the scope of producing method of the invention.

First, a substrate 10 of a slide for microscope is prepared. A ground color layer 201 with a thickness of 20 micrometers is coated on a mark area 20 of the substrate 10 by means of screen printing, then a first label layer 202 of laser induced ink coating with a thickness of 8 micrometers is formed on the ground color layer 201 by means of screen printing, and then a second label layer 203 with a thickness of 12 micrometer is formed on the first label layer 202 by means of screen printing. After solidification by UV irradiation, the production of the slide of the invention is completed.

Figure 3:
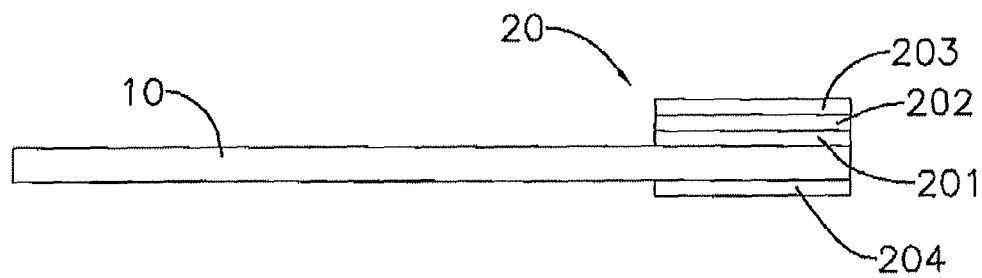
FIG. 3 is a side view of a second embodiment according to the invention.

As shown in FIG. 3, the second technical means of the invention is similar to the aforesaid first technical means. The difference therebetween merely resides in that a third label layer 204 is further formed on the other side of the substrate 10 opposite to the side on which the first label layer 202 and the second label layer 203 are formed. The third label layer 204 and the second label layer 203 are both selected from thermal induced ink coating or ink-jet coating. Therefore, in the following embodiment, identical or corresponding elements of the aforesaid embodiment are designated as the same reference numeral and the detailed description thereof is omitted.

The slide for the second technical means of the invention has a substrate 10, a mark area 20 formed on at least one area of the substrate 10. The mark area 20 at least comprises the following structure:

in order, a ground color layer 201 and a first label layer 202 are formed on a side of the mark area 20 of the substrate 10;

a second label layer 203 is formed on a side of the first label layer 202 opposite to the ground color layer 201;

a third label layer 204 is formed on the other side of the mark area of the substrate 10 opposite to the ground color layer 201.

In this embodiment, the thickness of the third label layer 204 is also between 5 micrometers and 30 micrometers. Preferably, the thickness of the third label layer 204 is 25 micrometers.

Similarly, by the embodiment of the second technical means, the invention can not only achieve the same efficacy of the aforesaid first technical means, but also achieve the goal of multi-functional marking by three different marking ways with the second label layer 203 and the third label layer 204 formed by different ink coating materials (e.g. thermal induced ink coating and ink-jet coating).

What is claimed is:

1. A label slide for multi-functional marking, comprising a substrate in which at least one area is formed as a mark area, the mark area comprising at least the following structure:
   a first label layer formed on at least one side of the mark area of the substrate; and
   a second label layer formed on a side of the first label layer opposite to the substrate, wherein a third label layer is further formed on the other side of the mark area of the substrate opposite to the first label layer.

2. The label slide for multi-functional marking according to claim 1, wherein the first label layer is laser induced ink coating and the second label layer is thermal induced ink coating or ink jet coating.

3. The label slide for multi-functional marking according to claim 1, wherein the first label layer is laser induced ink coating, and the second label layer and the third label layer are thermal induced ink coating or ink jet coating, respectively.

4. The label slide for multi-functional marking according to claim 1, wherein a ground color layer is optionally disposed between the first label layer and the substrate.

5. The label slide for multi-functional marking according to claim 4, wherein the thickness of the ground color layer is less than 20 micrometers.

6. The label slide for multi-functional marking according to claim 4, wherein the substrate is selected from one of the following optical transparent materials comprising glass, polycarbonate resin, polymethylmethacrylate and polystyrene resin.

7. The label slide for multi-functional marking according to claim 1, wherein the thicknesses of the first and the second label layers are between 5 to 30 micrometers.

8. The label slide for multi-functional marking according to claim 1, wherein the thicknesses of the first, the second and the third label layers are between 5 to 30 micrometers.

9. The label slide for multi-functional marking according to claim 1, wherein a ground color layer is optionally disposed between the first label layer and the substrate.

10. The label slide for multi-functional marking according to claim 9, wherein the thickness of the ground color layer is less than 20 micrometers.

11. The label slide for multi-functional marking according to claim 9, wherein the substrate is selected from one of the following optical transparent materials comprising glass, polycarbonate resin, polymethylmethacrylate and polystyrene resin.

12. The label slide for multi-functional marking according to claim 2, wherein a ground color layer is optionally disposed between the first label layer and the substrate.

13. The label slide for multi-functional marking according to claim 12, wherein the thickness of the ground color layer is less than 20 micrometers.

14. The label slide for multi-functional marking according to claim 12, wherein the substrate is selected from one of the following optical transparent materials comprising glass, polycarbonate resin, polymethylmethacrylate and polystyrene resin.

15. The label slide for multi-functional marking according to claim 3, wherein a ground color layer is optionally disposed between the first label layer and the substrate.

16. The label slide for multi-functional marking according to claim 15, wherein the thickness of the ground color layer is less than 20 micrometers.

17. The label slide for multi-functional marking according to claim 15, wherein the substrate is selected from one of the following optical transparent materials comprising glass, polycarbonate resin, polymethylmethacrylate and polystyrene resin.

* * * * *